United States Patent [19]
James

[11] Patent Number: 5,495,888
[45] Date of Patent: Mar. 5, 1996

[54] HEATER CONTROL

[75] Inventor: Robert W. James, St. Marys, Australia

[73] Assignee: F F Seeley Nominees Pty Ltd., St. Marys, Australia

[21] Appl. No.: 335,735
[22] PCT Filed: Mar. 11, 1994
[86] PCT No.: PCT/AU94/00122
§ 371 Date: Nov. 9, 1994
§ 102(e) Date: Nov. 9, 1994
[87] PCT Pub. No.: WO94/20796
PCT Pub. Date: Sep. 15, 1994

[30] Foreign Application Priority Data

Mar. 12, 1993 [AU] Australia ............... PL 7800

[51] Int. Cl.⁶ ..................................................... F24F 3/14
[52] U.S. Cl. ............................ 165/60; 361/617; 361/695; 392/367; 392/373
[58] Field of Search ................... 361/617, 694, 361/695; 454/224, 343; 237/50; 62/311; 392/373, 374, 360, 365–369; 165/60

[56] References Cited

U.S. PATENT DOCUMENTS 1,982,465  11/1934  Crafton ............................ 261/104
4,740,670  4/1988   You ................................. 392/360 X
4,867,047  9/1989   Citron ............................. 454/343 X

FOREIGN PATENT DOCUMENTS 387740  11/1941  Australia.

Primary Examiner—William E. Tapolcai
Attorney, Agent, or Firm—Watts, Hoffmann, Fisher & Heinke

[57] ABSTRACT

A heater control for controlling operation of a heater switch (12) in an evaporative cooler having an alternative heater mode in which a heater element (40) is energized and part of the air flow is blanketed by a shutter (37) controlled by a slide (24) or other operator. The slide (24) has a cam face (25) which directly or indirectly compresses a spring (22) as the shutter (41) is closed, the spring (22) otherwise biasing the heater switch (12) to its open contact state, but when the spring (22) is compressed, the switch (12) reverts to its closed contact state to energize the heater element (40).

6 Claims, 3 Drawing Sheets

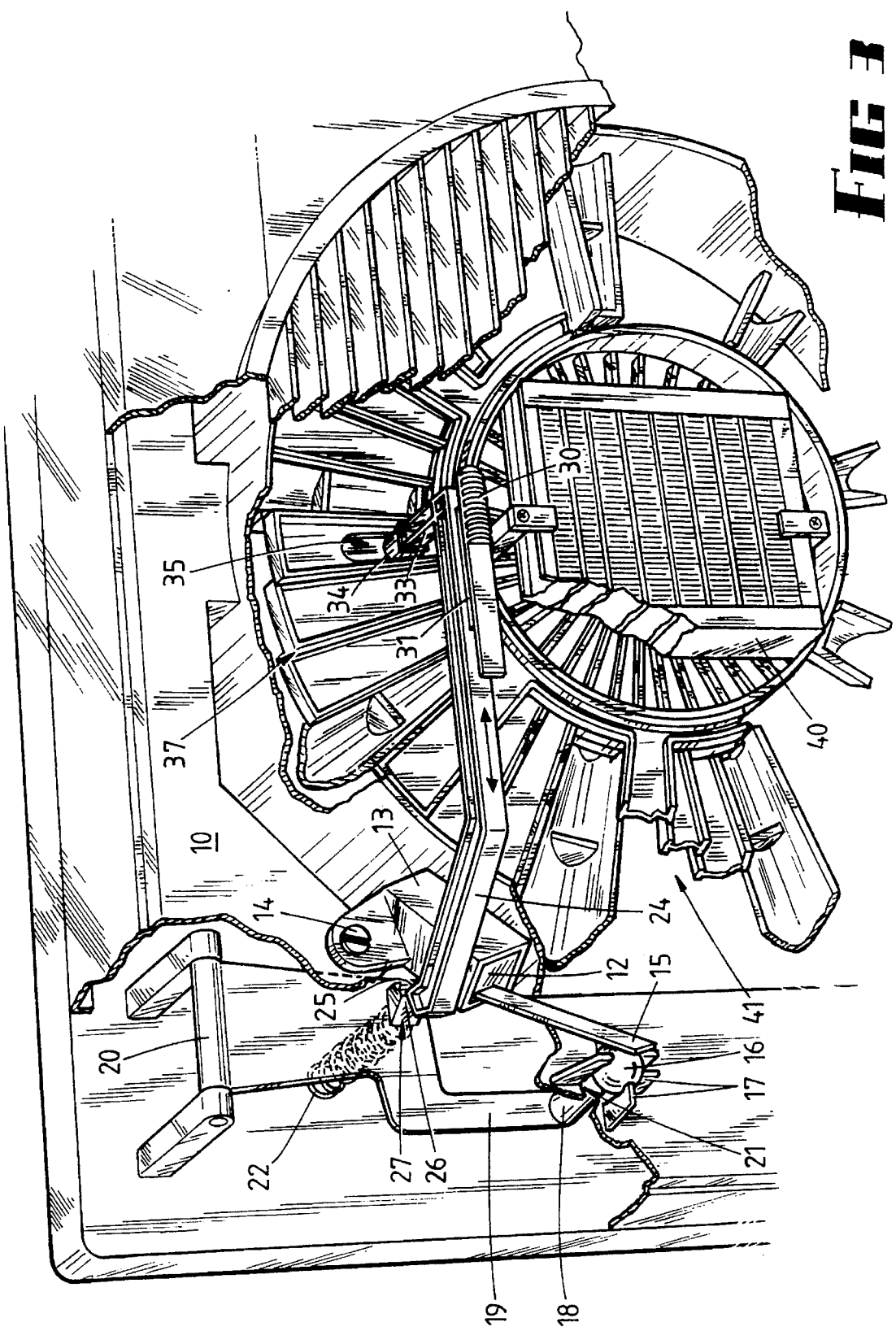

5,495,888

HEATER CONTROL

This invention relates to a control means for controlling a heater when incorporated in an evaporative type air conditioner.

BACKGROUND OF THE INVENTION

It is known to have reverse cycle air conditioners, but they require the use of compressors and complex heat exchanger arrangements which are not necessary in the much less expensive evaporative coolers. However, the absence of compressors makes the heating of an occupied space more difficult to achieve, other than with a direct heating means such as an element or a ceramic heater.

One of the problems which is encountered however, is that for cooling purposes it is desirable that an air conditioner should discharge large volumes of air, particularly when the cooling effect is achieved by evaporation of water. Without large volumes of air humidity rises too much, and some of the effectiveness of heat transfer to the human body is lost because of reduced velocity. Reference can be made to our co-pending Application Ser. No. 08/335,737, entitled Heater Attachment for Evaporative Cooler.

The specification thereof describes means to combat the above difficulty by reducing the size of the outlet opening from the motor and fan assembly of an evaporative cooler, the reduced size being applicable only when the conditioner is in a heating mode. This is described in said Application Ser. No. 08/335,737. One method of reducing the effective size is to cause vanes of a shutter to move from an open position where they are spaced apart to a closed position where they either abut or overlap. Another method is to hinge or slide a blanketing membrane across the inner surface of the vanes if they are of the fixed type. In each case, however, it is necessary to effect the movement manually, and it is also most desirable (although not always essential in the case of ceramic heaters) to have the switching arrangement interlocked with the blanketing arrangement so that the heater can only be switched on when the vanes inhibit the usual full flow of air from the device, and at all times when the usual full flow of air is discharged from the device, the heater is switched off.

Heretofore attempts which have been made have not been as simple and inexpensive as desired, and an object of this invention is to provide a very simple arrangement wherein the control means for controlling of the outlet of a cooler also actuates a switch which is normally biased to its OFF position.

Various types of automatic switching are already known, for example the pendulum type tilt switch. However, if a micro switch is used, it may be damaged, when used in an evaporative cooler by its ancillary switch control means. For example, if the cooler is accidentally dropped on its back, it is likely that a micro switch will be damaged by the impact of its control means.

This invention also seeks to provide safety means associated with a heater switch which is operated by closure of shutter means on an evaporative cooler.

Thus in this invention there is provided an operator which is movable with respect to the structure of an evaporative cooler, and that operator is provided with a cam surface which controls a switch which is normally biased to its OFF position, but closes the switch only at the end of travel when the operator is in the position where it will effect closure of at least part of the air outlet of a heating and cooling device.

The remaining part of the air outlet is in the path flow of air which also must pass over a direct heat heating type of element which can for example be a spiral nychrome wire or a ceramic type element.

As said above, it is also desirable that the switching arrangement should incorporate safety features so that, for example, if a heater/cooler combination is dropped onto its back, the switch is unlikely to be damaged, and in the invention use is made of a switch retained in its OFF position by a spring device. While the control engagement by the cam surface may be direct, the spring device may alternatively contact the micro switch through a freely movable member which is guided for its movement by guide means on the inner panel of the cooler, and is constrained in its movement sufficiently to avoid excessive deflection of the switch actuating finger.

BRIEF SUMMARY OF THE INVENTION

The invention can be summarised as a heater control for controlling operation of a heater switch in an evaporative cooler having an alternative heater mode in which a heater element is energised and part of the air flow is blanketed by a shutter controlled by a slide or other operator. The slide has a cam face which directly or indirectly compresses a spring as the shutter is closed, the spring otherwise biasing the heater switch to its open contact state, but when the spring is compressed, the switch reverts to its closed contact state to energise the heater element.

More specifically the invention consists of a heater control for controlling operation of a heater switch in an evaporative cooler having shutter means movable between an open free air flow position useable in a cooler mode and a closed part airflow position useable in a heater mode, comprising an operator carried by a structure of said cooler coupled to said shutter means and movable to control said shutter means between its said positions, a said heater switch being carried by said structure and having an extending actuating finger, spring means biasing said switch actuating finger towards an open contact state, and a cam face on said operator co-acting with said spring means to compress said spring means and thereby cause said switch to revert to its closed contact state, upon movement of said operator to close said shutter means.

BRIEF SUMMARY OF THE DRAWINGS

An embodiment of the invention is described hereunder in some detail with reference to, and is illustrated in, the accompanying drawings, in which

FIG. 3 is a cut-away perspective view which illustrates features of the invention.

Figure 1:
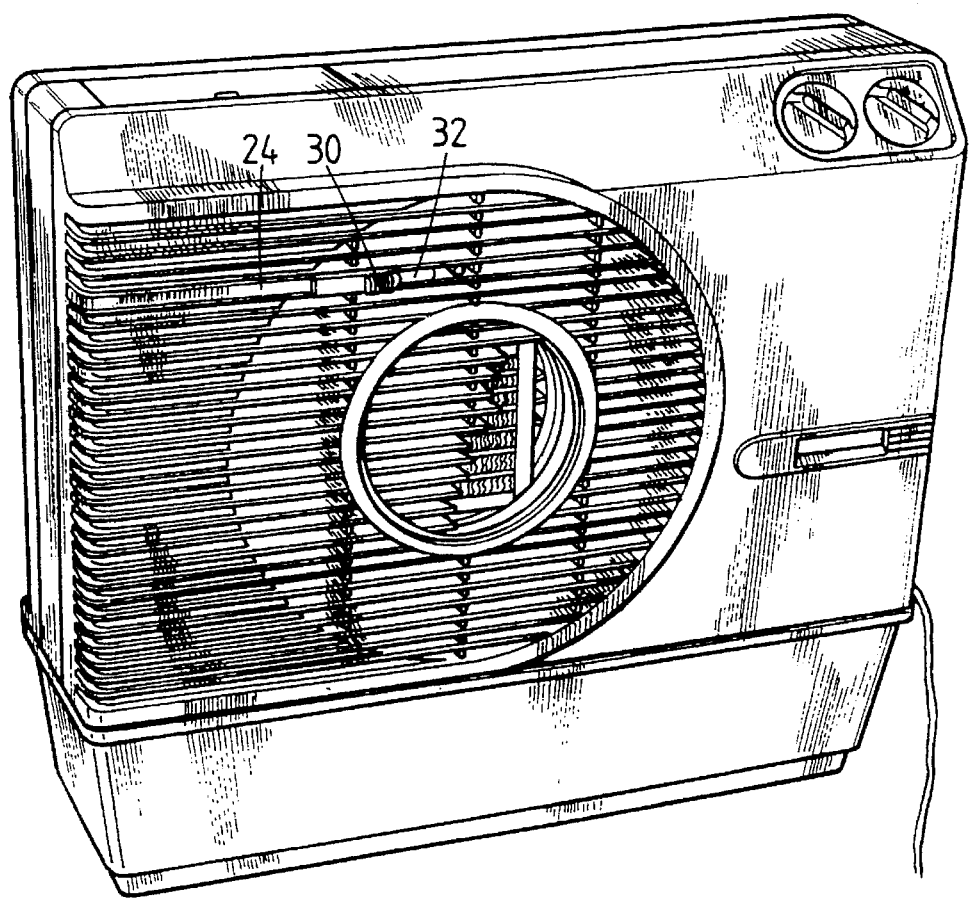
FIG. 1 is a front perspective of an evaporative cooler which is also operable in a heating mode.
Figure 2:
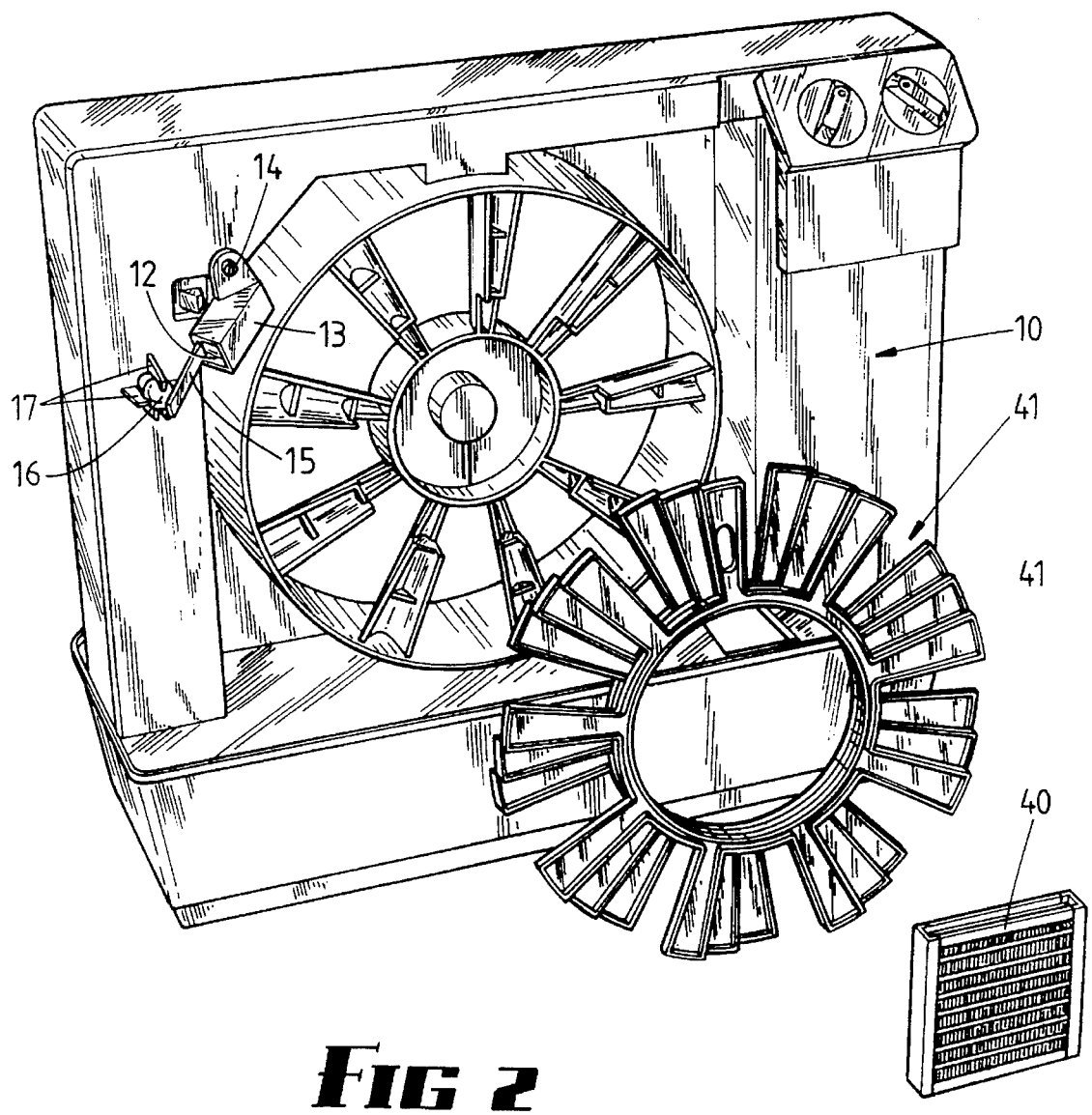
FIG. 2 is an "exploded" perspective view of same, without the front panel.

In this embodiment a combination of manual control, switch arrangement and spring is carried primarily by an inner panel 10 of an evaporative cooler 11 having a heating mode of operation. A micro switch 12 is retained to the inner panel 10 by a housing 13 secured with a fastener 14.

However, avoidance of damage to the micro switch 12 is one of the objects of this invention, and the micro switch has an outstanding spring loaded actuating finger 15 which is abutted by a movable abutment ball 16 constrained in its movements by guides 17 which have heads on their ends which limit movement of the ball 16, and the ball is moved by a pusher plunger 18 on the lower end of a spring arm 19 which is hinged at 20 at its upper end to a rear face of the inner panel 10. The plunger 18 extends through an aperture 21 in the inner panel 10, the aperture being of smaller diameter than ball 16 so as to inhibit rearward movement of the ball, while the length of plunger 18 is such that the spring arm 19 abuts the rear face of inner panel 10 before the actuating finger 15 can be overstressed. This however, is the normal location of the spring arm 19 (which is urged outwardly by spring 22, but can be a moulding of elastomeric material) and the switch will only operate when the spring arm is moved away from the rear face of the panel 10. This is effected by a manually actuated slide 24 which has a cam face 25 which bears against a complementary cam surface 26 on a lug 27 projecting forwardly from the spring arm 19 intermediate its ends. A combination projection and recess on the face 25 and cam surface 26 indicate to a user that travel end has been reached and inhibits inadvertent release of the slide 24. If however, release does take place, slide 24 can only move to once again release the spring arm 19 so that the switch 13 returns to its normal OFF position.

In order to achieve the sliding movement of the slide 24, there is provided a finger engagement portion 30, and a web 31 displaces the engagement portion 30 away from face 25, the faces of the web sliding in a slot in the front panel of the cooler 11.

The end of the slide 24 remote from cam surface 26 is provided with a rearwardly extending arm 33 with a circular projection 34 extending therefrom, which engages in a slot 35 in a finger 36 of the finger set 37 of a shutter assembly, and the cam face 25 engages cam surface 26 of the spring arm 19 when the shutter closure nears completion, so that the element 40 is energised by closure of switch 12 when the shutter is closed.

Details of the heating element 40 and shutter arrangement 41 are described in our aforesaid co-pending application Ser. No. 08/335,737.

A consideration of the above embodiment will indicate that the invention is exceedingly simple. The switch operating finger 15 is normally urged by spring 22 in a direction which biases the switch to its OFF position, and the movement of ball 16 is inhibited in a rearward direction by the walls defining the aperture 21 in the inner panel 10. It will be seen that in some instances there is no need for the ball 16 but the plunger 18 can make direct contact with the actuating finger 15 of micro switch 12, or alternatively the slide 24 can be shaped to directly contact the finger 15.

The claims defining the invention are as follows:

1. A heater control for controlling operation of a heater switch in an evaporative cooler having shutter means movable between an open free air flow position useable in a cooler mode and a closed part airflow position useable in a heater mode, comprising an operator carried by a structure of said cooler coupled to said shutter means and movable to control said shutter means between its said positions, a said heater switch being carried by said structure and having an extending actuating finger, spring means biasing said switch actuating finger towards an open contact state, and a cam face on said operator co-acting with said spring means to compress said spring means and thereby cause said switch to revert to its closed contact state, upon movement of said operator to close said shutter means.

2. A heater control according to claim 1 wherein said operator is a manually operated elongate slide coupled at one end to said shutter means and having said cam surface at an opposite end.

3. A heater control according to claim 1 further comprising a spring arm, hinge means coupling one end of said spring arm to said cooler structure, and pusher means on said spring arm aligned with said switch actuating finger, said spring bearing against said spring arm and against said cooler structure to effect said biasing of the switch actuating finger.

4. A heater control according to claim 3 further comprising freely movable abutment means between said pusher means and said switch actuating finger, and surfaces on said cooler structure which both guide said abutment means for movement and limit extent of said movement.

5. A heater control according to claim 3 wherein said pusher means comprises a plunger on an end of said spring arm and a freely movable abutment ball between the plunger and said switch actuating finger, and surfaces on said cooler structure which both guide the ball for movement and limit extent of said movement.

6. A heater control according to claim 1 wherein said operator is a manually operated elongate slide, and said shutter comprises a finger set having radiating fingers rotatable between an open free air flow position and a closed position obstructing air flow from a fan of said cooler, surfaces defining a slot in one of said fingers, said slide having a projection at one end engaging said slot, and its said cam face at the other end, the cam face effecting said compression of spring means as the shutter closure means completion.

* * * * *